(12) United States Patent
Matsubara et al.

(10) Patent No.: US 11,056,987 B2
(45) Date of Patent: Jul. 6, 2021

(54) MOTOR SYSTEM

(71) Applicants: Toyota Jidosha Kabushiki Kaisha, Toyota (JP); Denso Corporation, Kariya (JP)

(72) Inventors: Kiyotaka Matsubara, Ichinomiya (JP); Makoto Nakamura, Okazaki (JP); Daigo Nobe, Toyota (JP); Ryuji Omata, Kariya (JP)

(73) Assignee: Denso Corporation, Kariya (JP)

( * ) Notice: Subject to any disclaimer, the term of this patent is extended or adjusted under 35 U.S.C. 154(b) by 186 days.

(21) Appl. No.: 16/360,559

(22) Filed: Mar. 21, 2019

(65) Prior Publication Data
US 2019/0296665 A1    Sep. 26, 2019

(30) Foreign Application Priority Data

Mar. 22, 2018   (JP) .............................. JP2018-055296

(51) Int. Cl.
| | |
|---|---|
| H02P 6/08 | (2016.01) |
| H02P 21/22 | (2016.01) |
| H02P 6/12 | (2006.01) |
| H02P 11/00 | (2006.01) |
| H02P 27/06 | (2006.01) |
| H02M 7/44 | (2006.01) |
| H02P 11/06 | (2006.01) |
| B60L 15/02 | (2006.01) |
| H02P 6/04 | (2016.01) |

(52) U.S. Cl.
CPC .............. *H02P 6/08* (2013.01); *B60L 15/025* (2013.01); *H02M 7/44* (2013.01); *H02P 6/12* (2013.01); *H02P 11/06* (2013.01); *H02P 21/22* (2016.02); *H02P 27/06* (2013.01); *H02P 2006/045* (2013.01)

(58) Field of Classification Search
USPC .................................. 318/800, 801, 400.02
See application file for complete search history.

(56) References Cited

U.S. PATENT DOCUMENTS

| | | | |
|---|---|---|---|
| 2006/0164028 A1 | 7/2006 | Welchko et al. | |
| 2019/0260324 A1* | 8/2019 | Kuramitsu | ........... B62D 5/0484 |
| 2020/0343847 A1* | 10/2020 | Miyashita | ............... H02P 27/08 |

FOREIGN PATENT DOCUMENTS

| | | |
|---|---|---|
| JP | 2000-125411 A | 4/2000 |
| JP | 2000-324871 A | 11/2000 |
| JP | 2006-238686 A | 9/2006 |

* cited by examiner

*Primary Examiner* — Jorge L Carrasquillo
(74) *Attorney, Agent, or Firm* — Dinsmore & Shohl LLP

(57) ABSTRACT

A motor system provided with one motor and two inverters includes a first inverter control unit which changes a frequency of a first carrier wave (first carrier frequency) used for producing a switching signal fora first inverter according to an operating point of the motor; and a second inverter control unit which changes a frequency of a second carrier wave (second carrier frequency) used for producing a switching signal for a second inverter according to an operating point of the motor. The first carrier frequency has a changing characteristic depending on the first inverter control unit and the second carrier frequency has a changing characteristic depending on the second inverter control unit, and the changing characteristics are different from each other to make the first carrier frequency and the second carrier frequency differ from each other at an identical operating point.

2 Claims, 12 Drawing Sheets

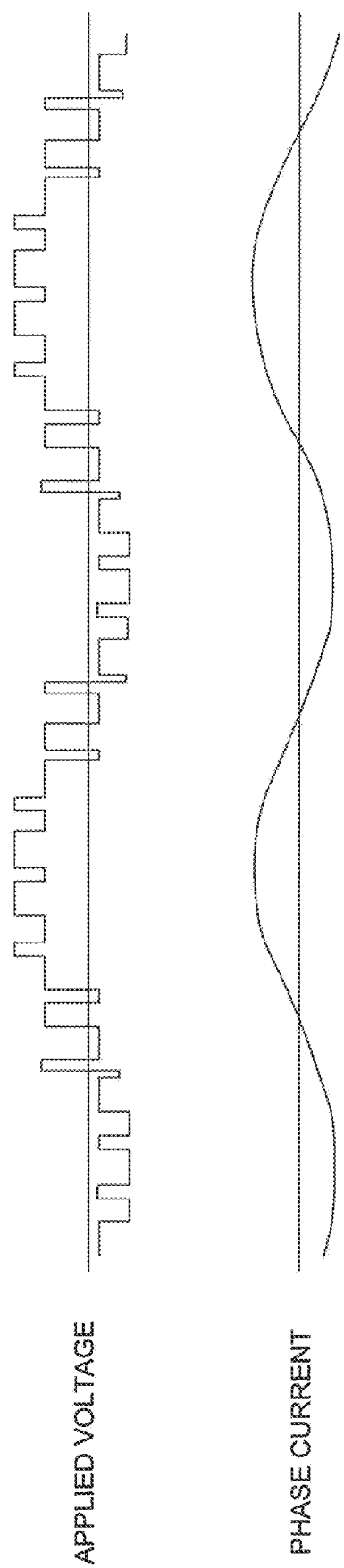

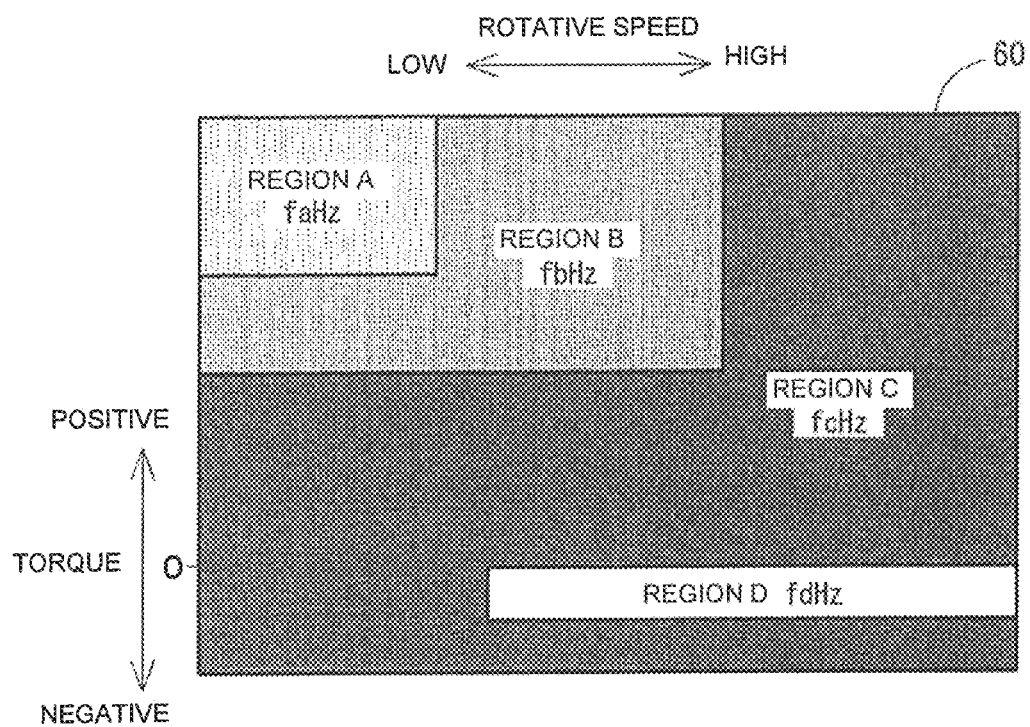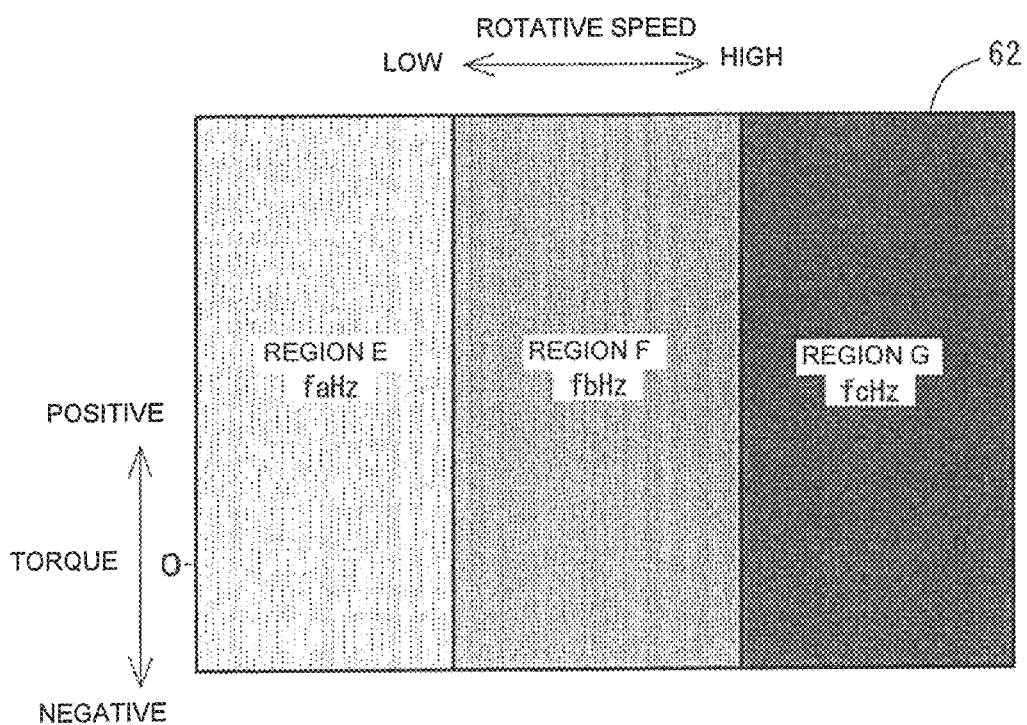
FIG. 9

|  | FIRST INV | SECOND INV |
|---|---|---|
| REGION A | f a | f a-α |
| REGION B | f b | f b-α |
| REGION C | f c | f c-α |
| REGION D | f d | f d-α |
| REGION E | f a | f a-α |
| REGION F | f b | f b-α |
| REGION G | f c | f c-α |
FIG. 10
FIG. 11A
FIG. 11B

MOTOR SYSTEM

CROSS REFERENCE TO RELATED APPLICATION

This application claims priority to Japanese Patent Application No. 2018-055296 filed on Mar. 22, 2018, which is incorporated herein by reference in its entirety including the specification, claims, drawings, and abstract.

TECHNICAL FIELD

The present description discloses a motor system including two power supplies and two inverters. In the motor system, one motor is driven by outputs from the two inverters.

BACKGROUND ART

JP 2000-324871 A discloses a motor system including two power supplies and two inverters. In this motor system, one motor is driven by outputs from the two inverters. In this system, each phase of the star-connected motor includes two windings connected in series. One inverter is connected to a winding end of each phase, and the other inverter is connected to an intermediate point between the windings. Accordingly, it is possible to drive the motor by an output from one inverter, using the two windings (a first drive winding) connected in series and to drive the motor by an output from the other inverter, using the winding disposed in the inner side of the intermediate point (a second drive winding).

Furthermore, JP 2000-125411 A discloses a system including two power supplies; that is, a battery and a fuel cell, and two inverters which are respectively connected to the power supplies. Herein, outputs of the two inverters are respectively connected to both ends of a three-phase coil of one motor. In this system, the two inverters are controlled independently while the battery and the fuel cell are made to have an equal midpoint voltage so as to meet a requirement of output from a motor, changing output from the battery and without changing output from the fuel cell.

CITATION LIST

Patent Literature

[Patent Document 1] JP 2000-324871 A
[Patent Document 2] JP 2000-125411 A

Each of the systems disclosed in JP 2000-324871 A and JP 2000-125411 A includes a PWM control unit corresponding to one inverter and a PWM control unit corresponding to the other inverter, and each PWM control unit produces a switching signal for the corresponding inverter.

Herein, in PWM control, a switching signal for an inverter is produced based on a comparison of a carrier wave at a predetermined frequency with a voltage command waveform. Neither JP 2000-324871 A nor JP 2000-125411 A describes how to determine a frequency of this carrier wave. That is why a carrier frequency is not set appropriately in the systems disclosed in JP 2000-324871 A and JP 2000-125411 A, and ripples in a motor current may be created in those systems.

The present description discloses a motor system which produces a switching signal that enables further reduction of ripples in a motor current.

SUMMARY

A motor system disclosed in the present description includes: a first inverter which converts direct current power from a first power supply into alternating current power; a second inverter which converts direct current power from a second power supply into alternating current power; a motor which is driven by the alternating current power from the first inverter and the alternating current power from the second inverter; a motor control unit which calculates a motor voltage vector corresponding to an output request for the motor, distributes the motor voltage vector obtained to the first inverter and the second inverter, and outputs a first voltage command and a second voltage command according to a result of the distribution; a first inverter control unit which produces a switching signal for driving the first inverter based on a comparison of a first carrier wave with a modulated wave that represents the first voltage command from the motor control unit, the first inverter control unit being configured to change a first carrier frequency, or a frequency of the first carrier wave, according to at least an operating point of the motor; and a second inverter control unit which produces a switching signal for driving the second inverter based on a comparison of a second carrier wave with a modulated wave that represents the second voltage command from the motor control unit, the second inverter control unit being configured to change a second carrier frequency, or a frequency of the second carrier wave, according to at least an operating point of the motor, wherein the first carrier frequency has a changing characteristic depending on the first inverter control unit and the second carrier frequency has a changing characteristic depending on the second inverter control unit, wherein the changing characteristics are different from each other to make the first carrier frequency and the second carrier frequency differ from each other at an identical operating point.

With such an arrangement, the first carrier frequency and the second carrier frequency are different from each other on a constant basis. Accordingly, it is possible to reduce ripples of a motor current.

The first inverter control unit may also change the first carrier frequency depending on a temperature of the first inverter, and the second inverter control unit may also change the second carrier frequency depending on a temperature of the second inverter.

Such an arrangement allows setting of a carrier frequency suitable for a temperature of a corresponding inverter, which protects each inverter appropriately.

The first inverter control unit stores a high-temperature frequency map and a normal frequency map as frequency maps in which a correlation between the operating point and the first carrier frequency is recorded, where the high-temperature frequency map is referred to when the first inverter is at a temperature equal to or higher than a first temperature and the normal frequency map is referred to when the first inverter is at a temperature lower than the first temperature, and the second inverter control unit stores a high-temperature frequency map and a normal frequency map as frequency maps in which a correlation between the operating point and the second carrier frequency is recorded, where the high-temperature frequency map is referred to when the second inverter is at a temperature equal to or higher than a second temperature and the normal frequency map is referred to when the second inverter is at a temperature lower than the second temperature. Herein, the first temperature and the second temperature may be different from each other.

Such an arrangement allows reference to a frequency map according to thermal characteristics of each inverter, which protects each inverter more appropriately and prevents excessive reduction in carrier frequency.

The first inverter and the second inverter may be similar in type.

Although the first inverter and the second inverter are similar in type, the first carrier frequency and the second carrier frequency are different from each other. This simplifies the arrangement of the motor system and reduces current ripples as well as noise in the motor system.

According to a motor system disclosed in the present description, a first carrier frequency and a second carrier frequency are different on a constant basis. Accordingly, it is possible to reduce ripples of a motor current.

BRIEF DESCRIPTION OF DRAWINGS

Embodiment(s) of the present disclosure will be described by reference to the following figures, wherein:

FIG. 4 is a diagram illustrating an applied voltage with respect to one phase of a motor and a waveform of a corresponding current;

FIG. 9 is a diagram illustrating an example of a frequency map stored in a first inverter control unit;

FIG. 10 is a table illustrating values of a first carrier frequency and a second carrier frequency of each region;

FIG. 11A is a diagram of the first carrier frequency, a modulated wave, and a switching signal for the first inverter;

FIG. 11B is a diagram of the second carrier frequency, a modulated wave, and a switching signal for the second inverter;

DESCRIPTION OF EMBODIMENTS

Hereinafter, an arrangement of a motor system will be described with reference to the drawings. It should be noted that the present disclosure is not limited to examples described herein.

"Arrangement of System"

Figure 1:
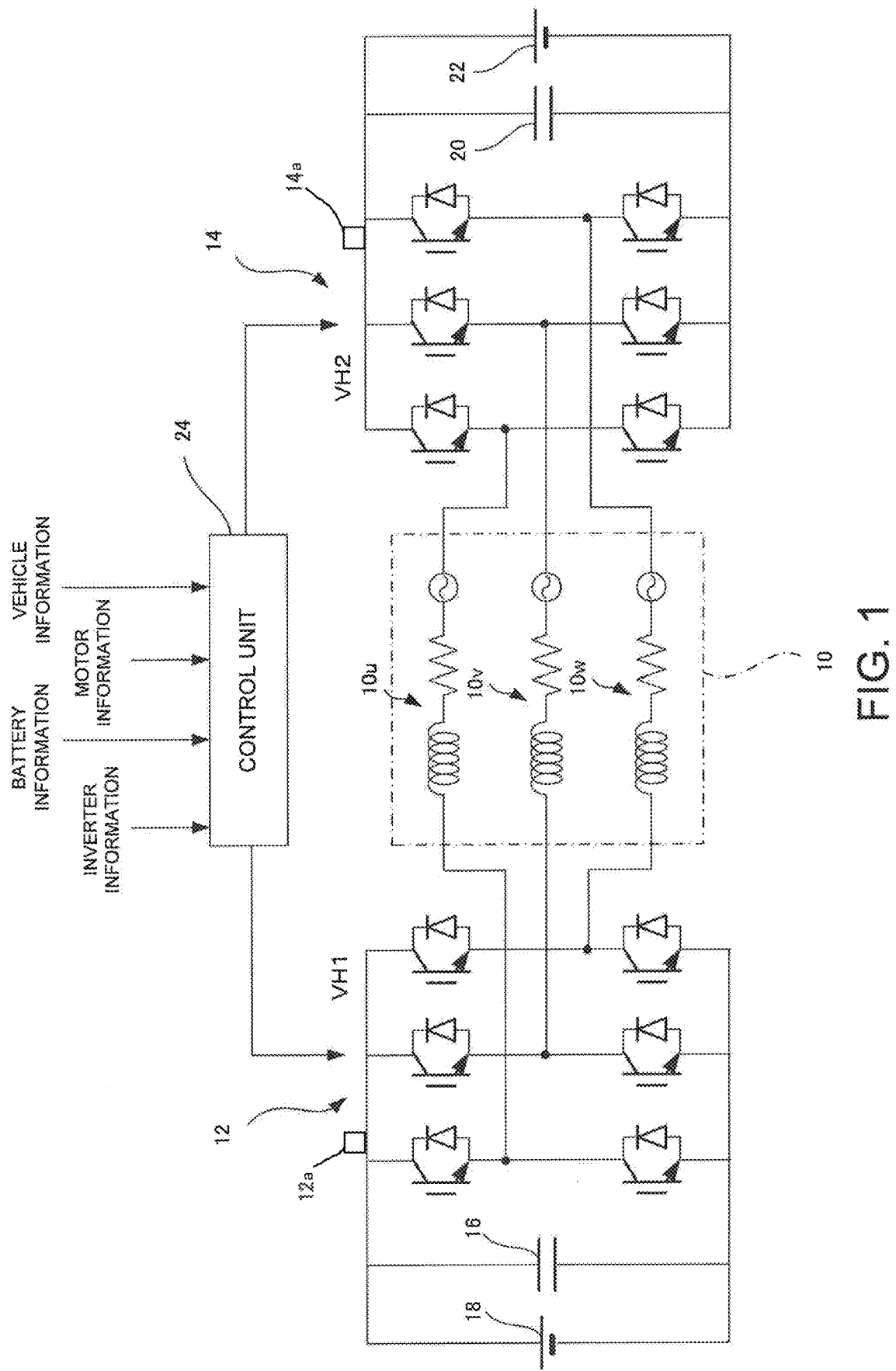
FIG. 1 is a diagram illustrating a general arrangement of a motor system according to an embodiment.

FIG. 1 is a diagram illustrating an arrangement of a motor system. A motor 10 functions not only as an electric motor that generates motive power but also as a generator that generates power. The motor 10 is a three-phase motor, including three-phase coils 10$u$, 10$v$, and 10$w$. Each of the coils 10$u$, 10$v$, and 10$w$ includes a reactor component, a resistance component, and an induced electromotive force (back electromotive force) component, and those coils are illustrated in the drawing as being connected in series. The motor 10 is assumed to be mounted on a vehicle, and the motor 10 is assumed to be a motor that generates a driving force for running the vehicle, a generator that generates power by motive power from an engine or braking torque, or a motor generator that functions as a motor and a generator.

Each of the three-phase coils 10$u$, 10$v$, and 10$w$ has one end connected to a first inverter 12 that converts direct current power to alternating current power, and each of the three-phase coils 10$u$, 10$v$, and 10$w$ has the other end connected to a second inverter 14. In addition, to the first inverter 12, a first capacitor 16 and, a first battery 18 are connected in parallel, and to the second inverter 14, a second capacitor 20 and a second battery 22 are connected in parallel. In this example, the first battery 18 and the second battery 22 are employed as a first and a second power supplies, but electric storage units such as capacitors may also be employed.

The first inverter 12 and the second inverter 14 are similar in type. The term "similar in type" indicates that the designs and characteristics (such as thermal characteristics and response characteristics) are equivalent. Accordingly, the first inverter 12 and the second inverter 14 are arranged in a similar manner, including three (three-phase) arms, each of which includes two switching elements connected in series. Herein, an intermediate point of the arm in each phase is connected to a corresponding phase of the coils 10$u$, 10$v$, and 10$w$. Accordingly, at the time of powering, power from the first battery 18 is supplied to the motor 10 through the first inverter 12, and at the time of regeneration (power generation), power from the motor 10 is supplied to the first battery 18 through the first inverter 12. The second inverter 14 and the second battery 22 also exchange power with the motor 10 in a similar manner.

In each switching element, a transistor such as an IGBT and a backward diode are connected in parallel. When a high-side transistor is turned on, a current flows toward a corresponding coil, and when a low-side transistor is turned on, a current is withdrawn from a coil in a corresponding phase.

A control unit 24 produces switching signals for the first inverter 12 and the second inverter 14 based on battery information, motor information, vehicle information, and the like so as to control switching of those inverters. The first inverter 12 includes a first temperature sensor 12$a$ that detects a temperature of the first inverter 12, and the second inverter 14 includes a second temperature sensor 14$a$ that detects a temperature of the second inverter 14. The detection results are transmitted to the control unit 24 as a first inverter temperature Tinv1 and a second inverter temperature Tinv2.

"Arrangement of Control Unit"

Figure 2:
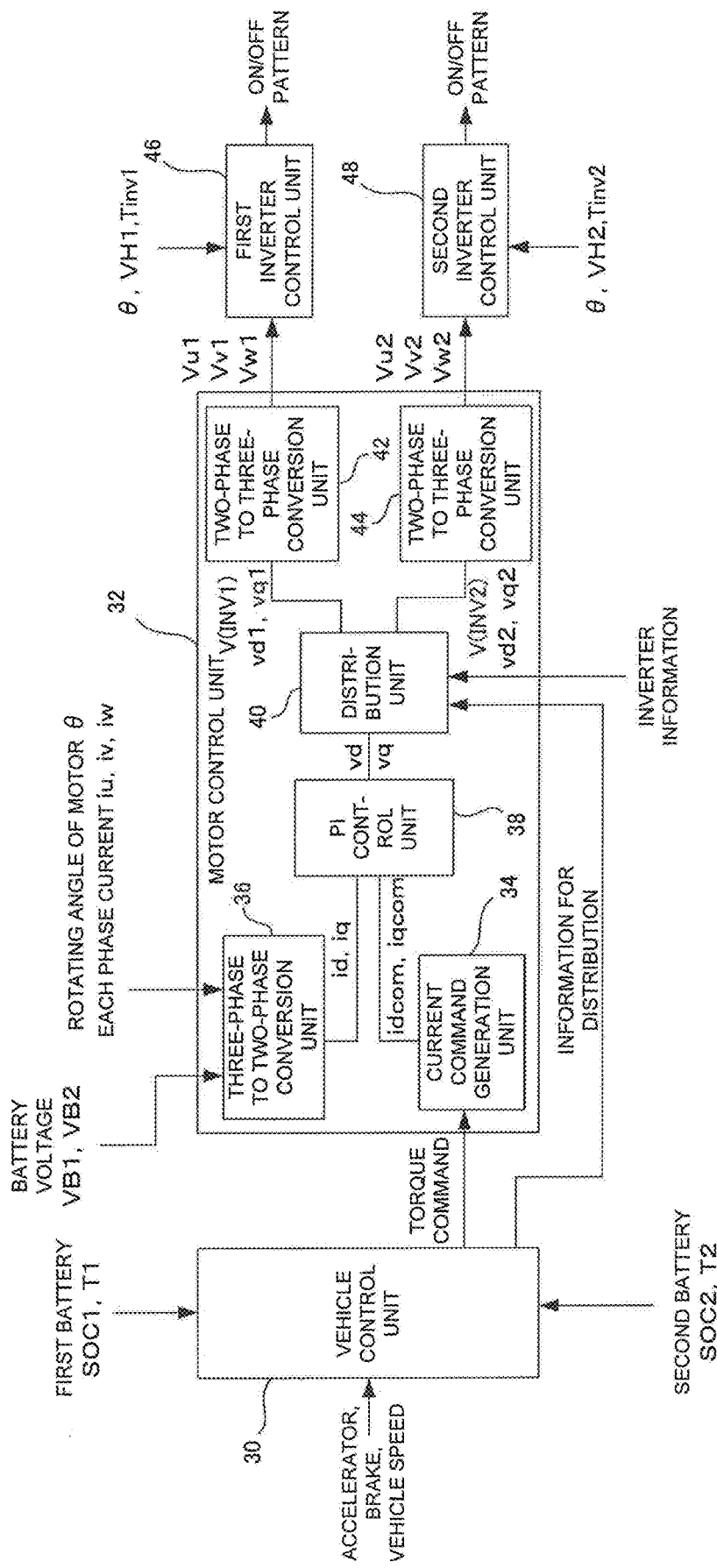
FIG. 2 is a diagram illustrating an arrangement of a control unit.

FIG. 2 illustrates an arrangement of the control unit 24. A vehicle control unit 30 receives information associated with a running vehicle, for example, control inputs of an accelerator pedal and a brake pedal and vehicle speeds, and receives battery information such as states of charge of the first battery 18 and the second battery 22 (SOC1 and SOC2) and temperatures of the first battery 18 and the second battery 22 (T1 and T2). Navigation information such as road conditions and destinations may be also be supplied to the vehicle control unit 30.

The vehicle control unit 30 calculates a torque command in regard to an output request (target output torque) for the motor 10 based on, for example, the control inputs of the accelerator pedal and the brake pedal.

The calculated torque command is supplied to a current command generation unit 34 of a motor control unit 32. Based on the torque command, the current command generation unit 34 calculates a d-axis current idcom and a q-axis current iqcom which are target current commands in vector control of the motor 10. A battery voltage VB1 of the first battery 18 and a battery voltage VB2 of the second battery 22, a rotor rotating angle θ of the motor 10, and each of phase currents iu, iv, and iw of the moment are supplied to a three-phase to two-phase conversion unit 36. The three-phase to two-phase conversion unit 36 converts each of the detected phase currents iu, iv, and iw into a d-axis current id and a q-axis current iq. The target current commands (d-axis and q-axis currents) idcom and iqcom from the current command generation unit 34 and the d-axis current id and the q-axis current iq from the three-phase to two-phase conversion unit 36 are supplied to a PI control unit 38, and a motor voltage vector V (d-axis excitation voltage command vd and q-axis torque voltage command vq) is calculated. The PI control unit 38 calculates a voltage command (motor voltage vector V (vd and vq)) by feedback control such as P (proportional) control and I (integral) control. Note that the feedback control may be carried out in combination with feedforward control such as predictive control.

The calculated motor voltage vector V (voltage commands vd and vq) are supplied to a distribution unit 40. The distribution unit 40 distributes the motor voltage vector V (voltage commands vd and vq) to a first inverter voltage vector V (INV1) (voltage commands vd1 and vq1) for the first inverter 12 and to a second inverter voltage vector V (INV2) (voltage commands vd2 and vq2) for the second inverter 14. The distribution performed by the distribution unit 40 will be described later.

The voltage commands vd1 and vq1 from the distribution unit 40 are supplied to a two-phase to three-phase conversion unit 42 in which those commands are converted into three-phase voltage commands Vu1, Vv1, and Vw1 for the first inverter 12 and from which those commands are output. The voltage commands vd2 and vq2 are supplied to a two-phase to three-phase conversion unit 44 in which those commands are converted into three-phase voltage commands Vu2, Vv2, and Vw2 for the second inverter 14 and from which those commands are output. Note that the current command generation unit 34, the three-phase to two-phase conversion unit 36, the PI control unit 38, the distribution unit 40, and the two-phase to three-phase conversion units 42 and 44 are included in the motor control unit 32.

The three-phase voltage commands Vu1, Vv1, and Vw1 for the first inverter 12 from the two-phase to three-phase conversion unit 42 are supplied to a first inverter control unit 46, and the three-phase voltage commands Vu2, Vv2, and Vw2 for the second inverter 14 are supplied to a second inverter control unit 48. The first inverter control unit 46 includes a CPU (not illustrated) that performs various calculations and a memory (not illustrated) that stores various kinds of data and programs. The memory stores frequency maps and a first changeover temperature Tc1 which are to be described. The rotor rotating angle θ, a first inverter input voltage VH1, and the first inverter temperature Tinv1 are supplied to the first inverter control unit 46. The first inverter control unit 46 produces switching signals for turning on or off the switching elements of the first inverter 12 based on a comparison of a first carrier wave with a modulated wave that represents each of the voltage commands Vu1, Vv1, and Vw1. Then, the first inverter control unit 46 supplies the switching signals to the first inverter 12. The first carrier wave which is referred to at the time of producing switching signals is, for example, a triangular wave, and a frequency of the first carrier wave (first carrier frequency) is determined by the first inverter control unit 46. This determination of the first carrier frequency will be described later.

In a similar manner, the second inverter control unit 48 includes a CPU that performs various calculations and a memory (not illustrated) that stores various kinds of data and programs. The memory stores frequency maps and a second changeover temperature Tc2 which are to be described. Based on a comparison of a second carrier wave with a modulated wave that represents each of the voltage commands Vu2, Vv2, and Vw2, the second inverter control unit 48 produces switching signals for turning on or off the switching elements of the second inverter 14 and supplies the switching signals to the second inverter 14. The second carrier wave which is referred to at the time of producing switching signals is, for example, a triangular wave, and a frequency of the second carrier wave (second carrier frequency) is determined by the second inverter control unit 48, as described later.

In this manner, the switching of the first inverter 12 and the second inverter 14 is controlled by the signals from the control unit 24. Accordingly, voltages applied to the motor 10 are added up, causing a flow of a current to the motor 10.

"Switching Waveform"

Figure 3A:
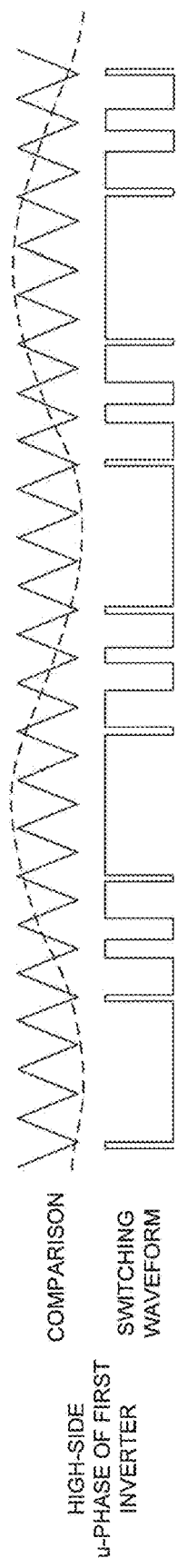
FIG. 3A is a diagram illustrating a switching waveform (at a 50:50 distribution ratio) of a high-side switching element of a first inverter.
Figure 3B:
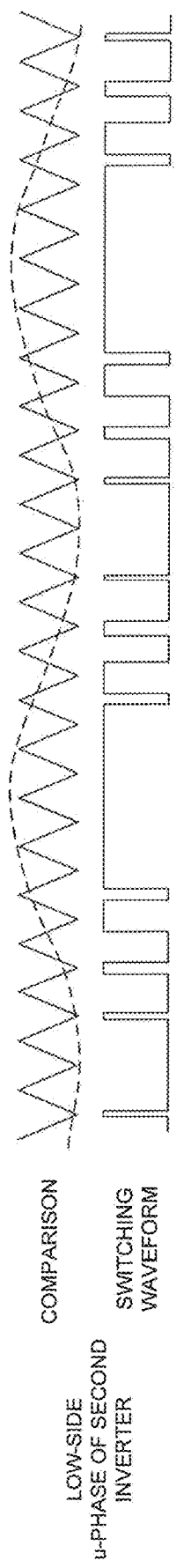
FIG. 3B is a diagram illustrating a switching waveform (at a 50:50 distribution ratio) of a low-side switching element of a second inverter.

FIGS. 3A and 3B illustrates production of the switching signals in the first inverter control unit 46 and the second inverter control unit 48. In the example illustrated in FIG. 3A, the upper part of the diagram illustrates a comparison of the first carrier wave (solid line) or the triangular wave with a modulated wave (broken line) that represents the voltage command Vu1 for a high-side u-phase switching element of the first inverter 12. The lower part of the diagram illustrates a switching waveform obtained by the comparison result. Similarly to FIG. 3A, in FIG. 3B, the upper part of the diagram illustrates a comparison of the second carrier wave (solid line) with a modulated wave (broken line) that represents the voltage command Vu2 for a low-side u-phase switching element of the second inverter 14. The lower part of the view illustrates a switching waveform obtained by the comparison result. In this example, since the first carrier wave and the second carrier wave have different frequencies, the resulting switching waveforms also differ slightly.

Due to such a switching operation, a current flows from the high-side u-phase switching element of the first inverter 12 to the low-side u-phase switching element of the second inverter 14 through the u-phase coil 10u of the motor 10. The switching operations for the first inverter 12 and the second inverter 14 are controlled in such a manner that currents having phases different from each other by 120 degrees flow through the u-phase coil 10u, the v-phase coil 10v, and the w-phase coil 10w of the motor 10. In this example, there is a period in which the modulated wave representing a voltage command continuously exceeds the triangular wave, and this period causes overmodulation PWM control.

"Motor Voltage and Current"

The upper row of FIG. 4 illustrates an applied voltage with respect to one phase of the motor 10, and the lower row of the diagram illustrates a motor current (phase current). A voltage applied to each phase of the motor 10 is formed from an induced voltage (back electromotive voltage) generated by the motor 10, and output voltages of the first inverter 12 and the second inverter 14 (voltages output by turning on or off the switching elements). In other words, the switching elements of the first inverter 12 and the second inverter 14 are turned on or off by switching signals as illustrated in FIGS. 3A and 3B, and a voltage in one direction for a current flowing from the first inverter 12 to the second inverter 14 is applied to one phase of the motor 10. Simultaneously, a voltage in the other direction for a current flowing from the second inverter 14 to the first inverter 12 is applied to one phase of the motor 10 by signals having the opposite phase. Since a phase current depends on a voltage to be applied, application of a voltage as illustrated in the upper row of FIG. 4 causes a phase current as illustrated in the lower row of FIG. 4 to flow in one phase of the motor 10.

"Distribution of Outputs in Two Inverters"

The distribution unit 40 in FIG. 2 distributes the motor voltage vector V (vd and vq) to the first and the second inverter voltage vectors V (INV1) and V (INV2) based on, for example, various kinds of information (information for distribution) supplied from the vehicle control unit 30, which is a higher-order control unit, and based on inverter information that indicates operating states of the first inverter 12 and the second inverter 14. While a motor voltage vector is maintained, the motor voltage vector is distributed to two inverter voltage vectors. Accordingly, this distribution involves changes of the motor voltage vector in magnitude, phase, and positive/negative directions.

"Changes in Distribution Ratio of Output"

Figure 5:
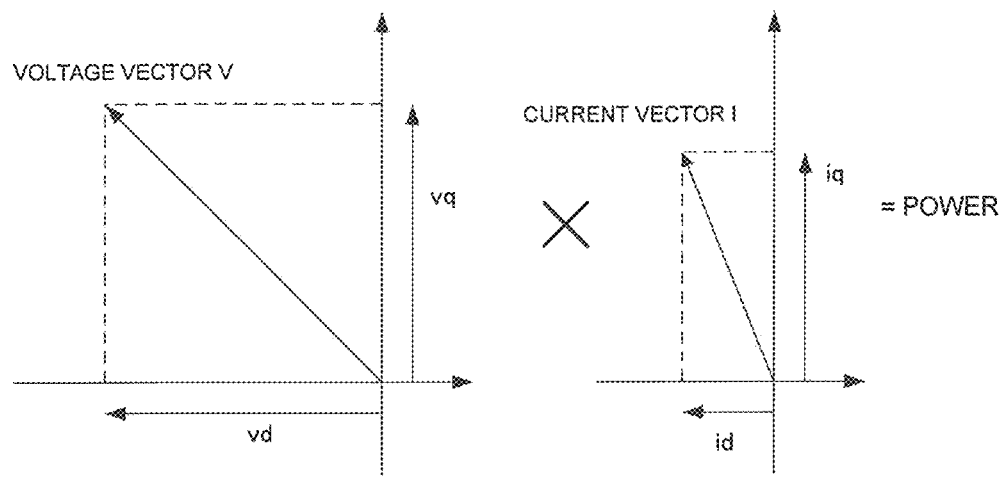
FIG. 5 is a diagram for describing a motor voltage vector in a case of using one inverter.

The distribution of the motor voltage vector V will be described with reference to FIGS. 5 to 8B. FIG. 5 is a diagram for describing the motor voltage vector V in a case of using one inverter, and FIGS. 6 to 8B are diagrams for describing an example of distribution of the motor voltage vector V in a case of using two inverter. In FIGS. 6 to 8B, the boldfaced solid line indicates the first inverter voltage vector V (INV1), and the boldfaced broken line indicates the second inverter voltage vector V (INV2). In FIGS. 5 to 8B, when the vectors overlap each other, those vectors are appropriately shifted to facilitate visualization.

FIG. 5 illustrates vector control of a voltage and a current at the time of normal motor drive with one inverter. The motor voltage vector V (d-axis voltage vd and q-axis voltage vq) and a motor current vector I (d-axis current id and q-axis current iq) are determined according to an output request for the motor 10. The motor voltage x the motor current produces an output (power).

Figure 6:
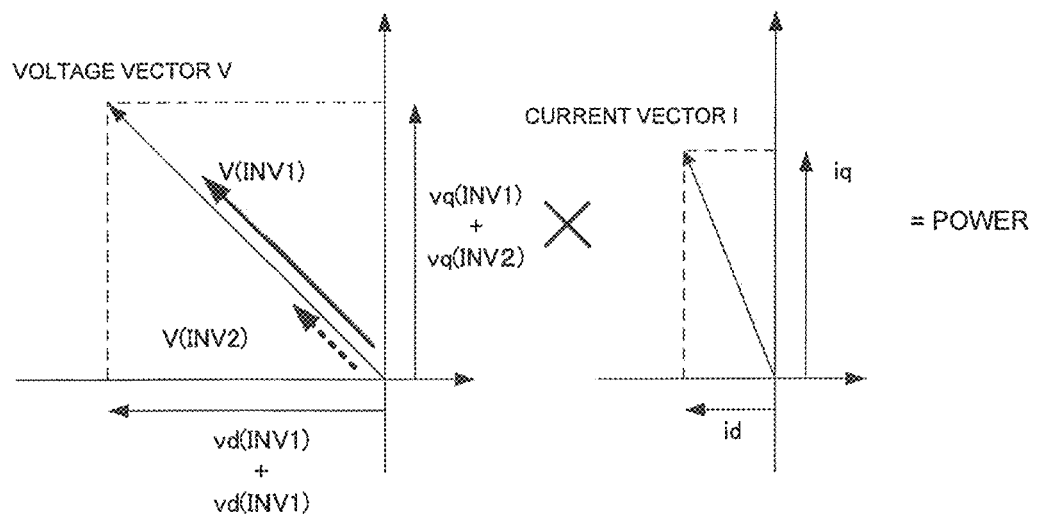
FIG. 6 is a diagram illustrating an example of distribution of a motor voltage vector in a case of using two inverters.

The system in this example includes two inverters, the first inverter 12 and the second inverter 14. Herein, outputs from the two inverters may be made unequal. In FIG. 6, the voltage vector V (INV1) of an output from the first inverter 12 (first inverter voltage vector) and the voltage vector V (INV2) of an output from the second inverter 14 (second inverter voltage vector) are changed in magnitude but not in phase. This case does not vary the output (power) from the motor 10 but varies the shape (waveform) of the switching signals in the first inverter 12 and the second inverter 14.

Provided that d-axis components of the outputs from the first inverter 12 and the second inverter 14 are vd (INV 1) and vd (INV2), the d-axis components vd=vd (INV1)+vd (INV2), and the q-axis components vq=vq (INV1)+vq (INV2).

Changing a distribution ratio while maintaining the phases of the voltage vectors V (INV1) and V (INV2), or two inverter outputs, as illustrated in FIG. 6 varies the waveform of the switching signals. This leads to variations in shape of a phase voltage with respect to the motor 10, causing an increase or a decrease in number of switching operations and variations in pulse width.

Furthermore, the outputs and losses in the first inverter 12 and the second inverter 14 vary, and heat generated in the first inverter 12 and the second inverter 14 also varies. Moreover, the variations in shape of the phase voltage leads to variations in shape of the phase current, causing variations in sound to be generated as well as in battery current.

In this manner, as the motor voltage vector V is distributed to the voltage vector V (INV1) of the first inverter 12 and the voltage vector V (INV2) of the second inverter 14 at any ratio, it is possible to meet requirements for the system.

Figure 7A:
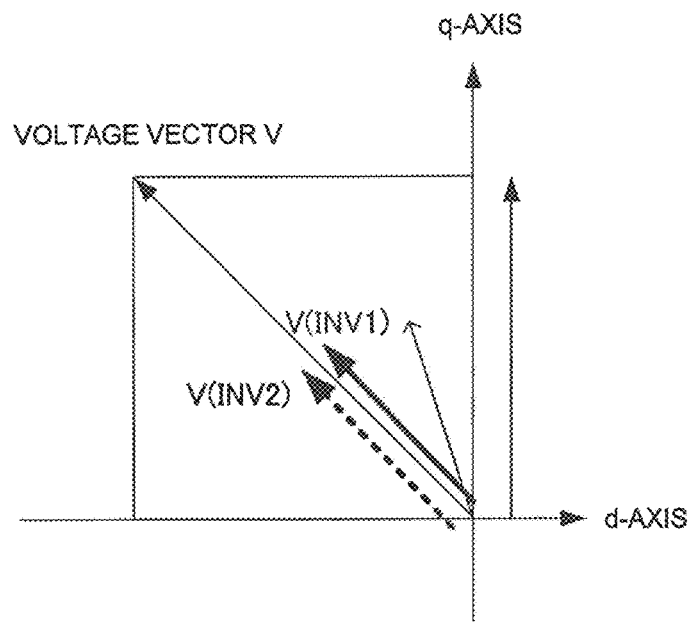
FIG. 7A is a diagram illustrating another example of distribution of the motor voltage vector in a case of using two inverters.

Herein, an aspect of distribution of the motor voltage vector V may be changed appropriately as necessary. For example, in powering mode (state of energy consumption), the magnitude of the voltage vector V (INV1) of the first inverter 12 and the magnitude of the voltage vector V (INV2) of the second inverter 14 may be changed, while the phases thereof are maintained. In this case, as illustrated in FIG. 7A, the magnitude of the voltage vector V (INV1) of the first inverter 12 and the magnitude of the voltage vector V (INV2) of the second inverter 14 may be made equal and may be distributed equally. In this embodiment, loads on the first inverter 12 and the second inverter 14 are substantially equal. Therefore, this embodiment is suitable when states (such as SOCs and temperatures) of the two batteries 18 and 22 and the two inverters 12 and 14 are substantially equivalent.

Furthermore, one voltage vector V may be made larger than the other voltage vector V. For example, as illustrated in FIG. 6, the voltage vector V (INV1) of the first inverter 12 may be increased and the voltage vector V (INV2) of the second inverter 14 may be decreased. According to the example illustrated in FIG. 6, a load on the first inverter 12 is large, and a load on the second inverter 14 is small. Therefore, this embodiment is suitable when there is a difference in state (such as SOCs and temperatures) between the two batteries 18 and 22 and the inverters 12 and 14, and when this difference should be eliminated.

Figure 7B:
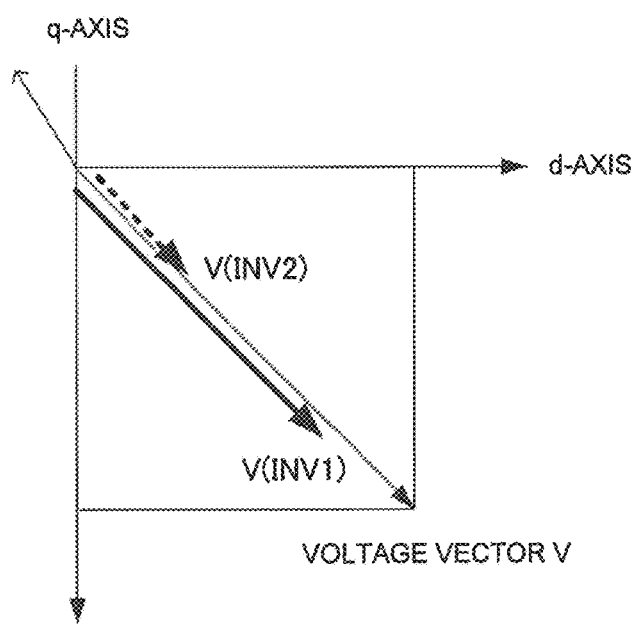
FIG. 7B is a diagram illustrating another example of distribution of the motor voltage vector in a case of using two inverters.

In addition, not only in powering mode but also in regeneration mode (state of energy recovery), the motor voltage vector V is distributed in a similar manner. FIG. 7B illustrates a case where, in regeneration mode (state of energy recovery), the voltage vector V (INV1) of the first inverter 12 and the voltage vector V (INV2) of the second inverter 14 are changed in magnitude but maintained in phase.

Figure 8A:
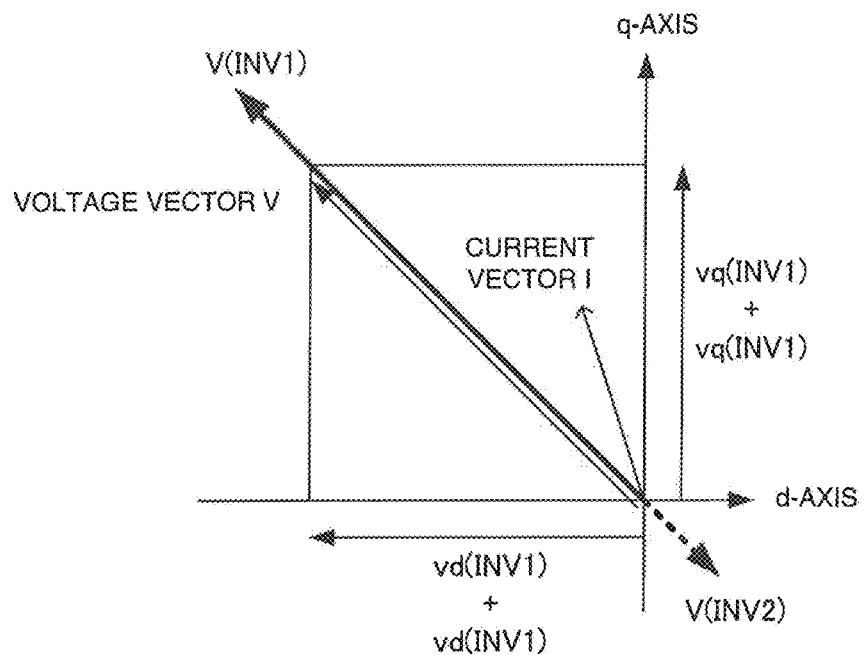
FIG. 8A is a diagram illustrating another example of distribution of the motor voltage vector in a case of using two inverters.

It is also possible to change a positive or a negative direction of either the voltage vector V (INV1) of the first inverter 12 or the voltage vector V (INV2) of the second inverter 14 without changing the motor voltage vector V. For example, as illustrated in FIG. 8A, the voltage vector V (INV1) of the first inverter 12 may be increased with respect to the motor voltage vector V by a predetermined amount, and the voltage vector V (INV2) of the second inverter 14 may be oriented to the regeneration side in equal amount. Accordingly, one of two inverters is in a state of energy consumption, while the other is in a state of energy flow.

Such an embodiment enables charging of the other battery with power of one battery without changing the motor voltage vector V (in powering mode).

Figure 8B:
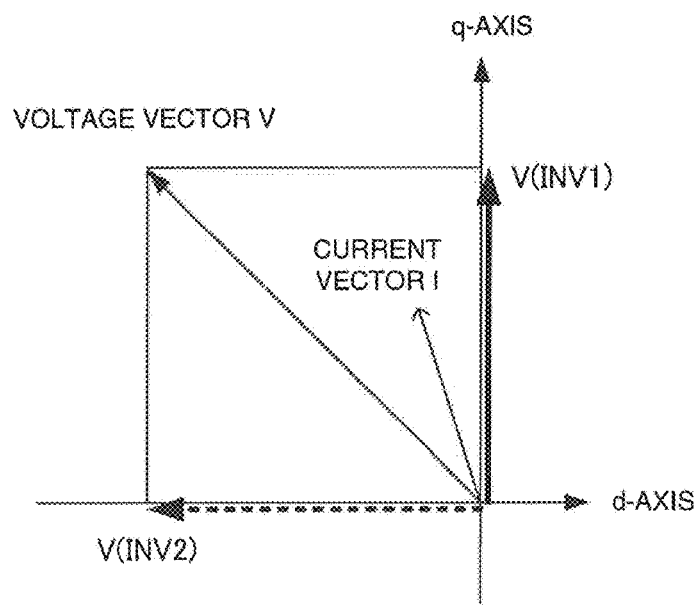
FIG. 8B is a diagram illustrating another example of distribution of the motor voltage vector in a case of using two inverters.

The voltage vector V (INV1) of the first inverter 12 and the voltage vector V (INV2) of the second inverter 14 may be, different from each other in phase. For example, as illustrated in FIG. 8B, the voltage vector V (INV1) of the first inverter 12 may be a q-axis voltage, and the voltage vector V (INV2) of the second inverter 14 may be a d-axis voltage. In addition to this example, as long as added vectors of the first inverter voltage vector V (INV1) and the second inverter voltage vector V (INV2) match the motor voltage vector V, the phases of the voltage vectors of the both inverters may be changed freely. Changing voltage vectors of two inverters in phase changes a power factor in outputs from the two inverters.

"Determination of Carrier Frequency"

As described above, in this example, switching signals are produced based on comparison results between carrier waves and modulated waves representing voltage commands. The higher the frequency (carrier frequency) of the carrier wave, the greater the improvement in controllability of the motor 10 improves and the greater the reduction in the amount of heat generation and the noise of the motor 10. On the other hand, a high carrier frequency increases power consumption, which reduces a consumption rate and increases the temperature of an inverter. When the motor 10 is locked in a stationary state, a current concentrates in one phase of the motor 10, leading to an increase in amount of inverter heat generation due to switch loss. Accordingly, there is no advantage in increasing the carrier frequency.

Therefore, in a case where motor heat generation causes greater trouble than inverter heat generation, or when the motor 10 is required to have high controllability, or when the noise of the motor 10 becomes a problem, the carrier frequency is desirably high. On the other hand, in a case where the inverter heat generation causes greater trouble than the motor heat generation, or when the motor 10 is locked in a stationary state, the carrier frequency is desirably low.

Accordingly, the first and the second inverter control units 46 and 48 change the carrier frequencies according to a state of drive of the motor 10 and states of drive of the inverters 12 and 14. In order to change the carrier frequencies, the inverter control units 46 and 48 store frequency maps and the changeover temperatures Tc1 and Tc2 of the frequency maps. In each frequency map, a correlation between an operating point of the motor 10 and the carrier frequency is recorded.

FIG. 9 is a diagram illustrating an example of the frequency maps stored in the first inverter control unit 46. In FIG. 9, the upper row is a normal frequency map 60, and the lower row is a high-temperature frequency map 62. In both of the maps 60 and 62, the rotative speed of the motor 10 is taken along the x-axis, and the torque is taken along the y axis. The frequency maps illustrated herein are used in a hybrid vehicle equipped with an engine (not illustrated) and the motor 10 as power sources for running the vehicle.

The high-temperature frequency map 62 is a map which is referred to when the first inverter temperature Tinv1 is equal to or higher than the prescribed first changeover temperature Tc1. The normal frequency map 60 is a map which is referred to when the first inverter temperature Tinv1 is lower than the prescribed first changeover temperature Tc1. In the normal frequency map 60 and the high-temperature frequency map 62, a correlation between the first carrier frequency and the operating point (torque and rotative speed) of the motor 10 is recorded. The normal frequency map 60 and the high-temperature frequency map 62, and the first changeover temperature Tc1 represent changing characteristics of the first carrier frequency.

More specifically, in the normal frequency map 60, as illustrated in FIG. 9, an operation range of the motor 10 is divided into a region A, a region B, a region C, and a region D. In the region A, the rotative speed is low and the torque is high. The region B includes a region with torque lower than that in the region A and a region with a rotative speed higher than that in the region A. The region C includes a region with torque lower than that in the region B and a region with a rotative speed higher than that in the region B. The region D is provided in a part of the region C. Each region is set at a corresponding first carrier frequency selected from fa to fd. Note that fa<fb<fc<fd. In other words, in a region with a low rotative speed and high torque as in the region A, inverter heat generation tends to cause greater trouble than motor heat generation. Therefore, in the region A, the first carrier frequency is set to the value fa on the lower side. In a region with a high rotative speed or high torque as in the region C, inverter heat generation causes greater trouble than motor heat generation, and such a region requires high controllability. Therefore, in the region C, the first carrier frequency is set to the value fc on the higher side. In a region with a medium rotative speed or medium torque as in the region B, the first carrier frequency is set to the value fib between the value fa and the value fc. Furthermore, in the region D, it is highly probable that the engine is not driven. The region D strongly requires reduction of noise in the motor 10. Therefore, in the region D, the first carrier frequency is set to the value fd which is higher than fc.

In addition, when the temperature Tinv1 of the first inverter 12 becomes equal to or higher than the prescribed first changeover temperature Tc1, the inverter control unit 46 refers to the high-temperature frequency map 62 instead of the normal frequency map 60 and determines the first carrier frequency. In the high-temperature frequency map 62, the operation range of the motor 10 is divided into three regions; that is, a region E (frequency fa), a region F (frequency fb), and a region G (frequency fc) according to the rotative speed of the motor 10. Compared with the normal frequency map 60, in the high-temperature frequency map 62, the range of a region with the lower frequency fa (region E) greatly increases. This is because the region makes it easier to reduce the first inverter temperature Tinv1.

The first inverter control unit 46 selects a frequency map to be referred to based on the first inverter temperature Tinv1, checks the operating point determined by the torque and the rotative speed of the motor 10 against the selected frequency map, and determines the first carrier frequency. The first inverter control unit 46 then produces a switching signal based on a comparison of the determined carrier wave of the first carrier frequency with a modulated wave representing a voltage command.

Similarly, the second inverter control unit 48 also stores a normal frequency map, a high-temperature frequency map, and the second changeover temperature Tc2 as information representing changing characteristics of the second carrier frequency. In a case where the second inverter temperature Tinv2 is equal to or higher than the second changeover temperature Tc2, the second inverter control unit 48 selects the high-temperature frequency map, and in a case where Tinv2<Tc2, the second inverter control unit 48 selects the normal frequency map. Then, the second inverter control unit 48 checks the operating point of the motor 10 against the selected frequency map and determines the second carrier frequency. An aspect of region division in the frequency maps stored in the second inverter control unit 48 is substantially equivalent to one illustrated in FIG. 9. However, in the frequency maps stored in the second inverter control unit 48, each region is set at a frequency different from the frequency maps stored in the first, inverter control unit 46.

FIG. 10 is a table illustrating a frequency of each region. As illustrated in FIG. 10, in any region, each frequency (second carrier frequency) corresponding to the second inverter 14 is smaller than each frequency (first carrier frequency) corresponding to the first inverter 12 by a frequency shift $\alpha$. For example, in the region A, the first carrier frequency is [fa], while the second carrier frequency is [fa-$\alpha$]. Furthermore, in the region C, the first carrier frequency is [fc], while the second carrier frequency is [fc-$\alpha$]. In other words, in this example, at an identical operating point, the first carrier frequency and the second carrier frequency define frequency maps which are different from each other. Note that the frequency shift $\alpha$ is a value at which current ripples (to be described) are reduced, and may be, for example, about 0.1% to 10% of the first carrier frequency (fa to fd).

In this example, the frequency shift added to the first carrier frequency (fa to fd) is fixed at a in any region, but the region may have different frequency shifts. For example, the frequency shift in region A may be $\alpha$, the frequency shift in region B may be $\beta$ ($\beta\neq\alpha$), and the frequency shift in region C may be $\gamma$ ($\gamma\neq\beta\neq\alpha$). In this example, the aspect of region division in the frequency maps is common in the first inverter 12 and the second inverter 14, but the aspect of region division may be different in the two inverters. For example, the normal frequency map 60 of the first inverter 12 may be divided into regions A to D, and the normal frequency map of the second inverter 14 may be divided into a smaller number or a larger number of regions. Furthermore, in this example, each of the inverter control units 46 and 48 stores two types of frequency maps (normal frequency map and high-temperature frequency map), but the number of types of frequency maps may be one or may be three or more. For example, each of the inverter control units 46 and 48 may store a low-temperature frequency map, a medium-temperature frequency map, and a high-temperature frequency map.

In this example, the first changeover temperature Tc1 and the second changeover temperature Tc2, the thresholds for switching frequency maps, are equivalent (Tc1=Tc2). This is because, in this example, the first inverter 12 and the second inverter 14 are similar in type and have similar temperature characteristics and the like. On the other hand, in a case where the first inverter 12 and the second inverter 14 have different characteristics (specifically, different temperature characteristics), it is desirable that the first changeover temperature Tc1 and the second changeover temperature Tc2 be different from each other. For example, when a heat resistant temperature of the second inverter 14 is lower than a heat resistant temperature of the first inverter 12, the second changeover temperature Tc2 is desirably lower than the first changeover temperature Tc1.

In the above description, the first and the second carrier frequencies are determined with reference to a frequency map. However, in the two inverter control units 46 and 48, as long as carrier frequencies have different changing characteristics, the carrier frequencies may be determined in another embodiment. For example, an equation may be formulated with variables indicating, for example, the torque and the rotative speed of the motor 10 and temperatures of inverters, and then, a carrier frequency of each inverter may be determined based on the equation. In this case, for example, constants in an equation to which the first inverter control unit 46 refers and constants in an equation to which the second inverter control unit 48 refers are made different. Due to such a difference, the inverter control units 46 and 48 are made to have different changing characteristics.

The second inverter control unit 48 and the first inverter control unit 46 store unique changing characteristics of carrier frequencies (frequency maps and changeover temperatures) and determine the carrier frequencies independently. Since, the two inverters 12 and 14 independently determine the carrier frequencies, it is possible to set carrier frequencies suitable for the inverters 12 and 14 as compared with a case where the two inverters 12 and 14 have an equal carrier frequency.

In other words, as described above, in this example, it is possible to freely change the first inverter voltage vector V (INV1) and the second inverter voltage vector V (INV2) in magnitude and in phase within a range where the added vector are kept constant. Accordingly, a load of one inverter may be larger than that of the other inverter, and a temperature of one inverter may be higher than that of the other inverter. In this case, if two inverters have an equal carrier frequency, for the purpose of equipment protection, it is necessary to reduce the carrier frequency according to an inverter heated to a high temperature. However, such a low carrier frequency is not always suitable for a low-temperature inverter.

On the other hand, as in this example, when carrier frequencies are determined by the two inverter control units 46 and 48 independently, it is possible to use a carrier frequency suitable fora state of a corresponding inverter 12 or 14, which protects the inverters 12 and 14 appropriately, and to set a carrier frequency suitable for each of the inverters 12 and 14.

Furthermore, as described above, in this example, the frequency maps (changing characteristic of the carrier frequency) are set to make the first carrier frequency and the second carrier frequency different from each other at an identical operating point. Such an arrangement reduces current ripples, leading to reduction in amount of heat generation in the motor 10 and noise in the motor 10.

This will be described with reference to FIGS. 11A to 14. FIG. 11A is a diagram of the first carrier frequency and the modulated wave (upper row), and the switching signal (lower row) for the first inverter 12. FIG. 11B is a diagram of the second carrier frequency and the modulated wave (upper row), and the switching signal (lower row) for the second inverter 14. In FIGS. 11A and 11B, the first inverter voltage vector V (INV1) and the second inverter voltage vector V (INV2) are equal in phase and in magnitude. Accordingly, the modulated waves in FIGS. 11A and 11B are similar. On the other hand, as in FIG. 11B, the second carrier frequency is twice as large as the first carrier frequency. This is why the switching timing in the second inverter 14 is shifted from that in the first inverter 12 and the number of switching operations is larger than that in the first inverter 12.

Figure 12:
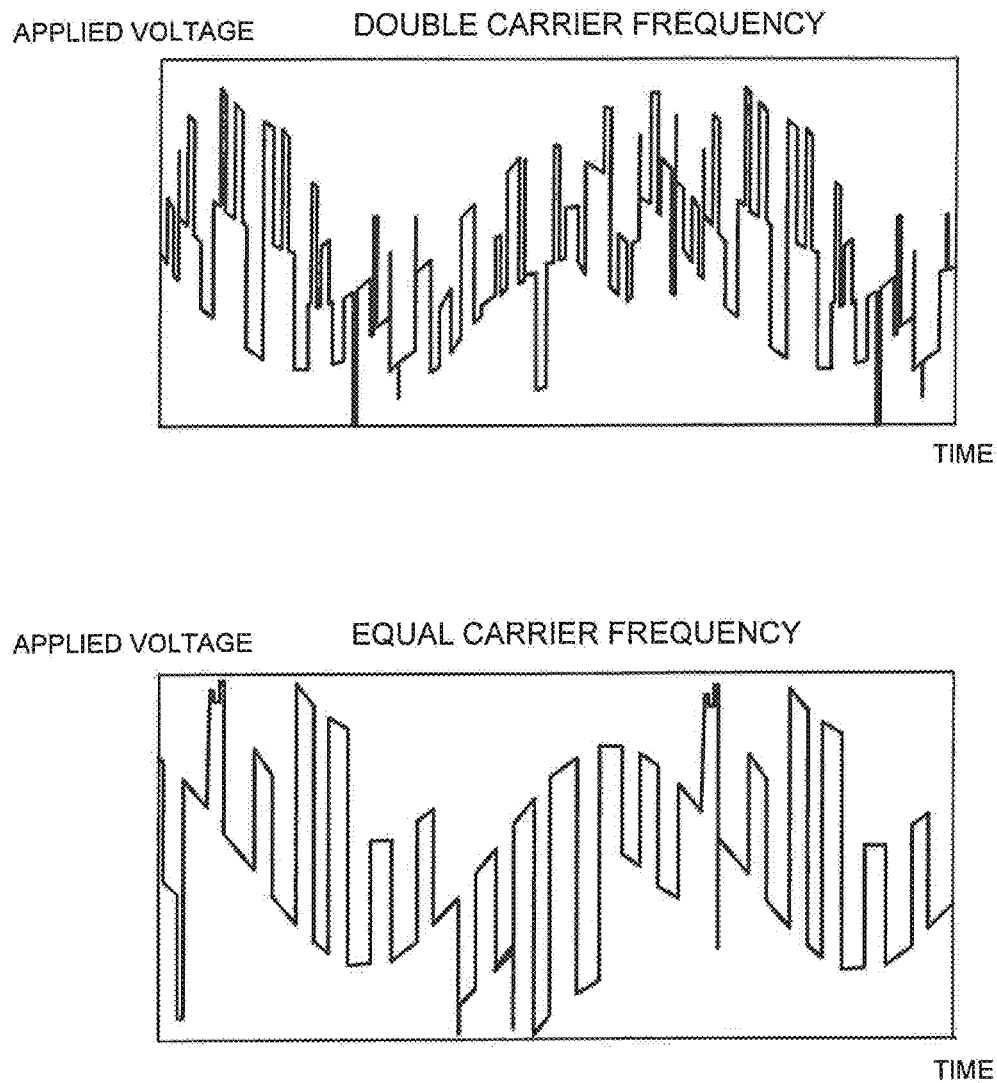
FIG. 12 is a diagram illustrating an applied voltage with respect to one phase of the motor.
Figure 13:
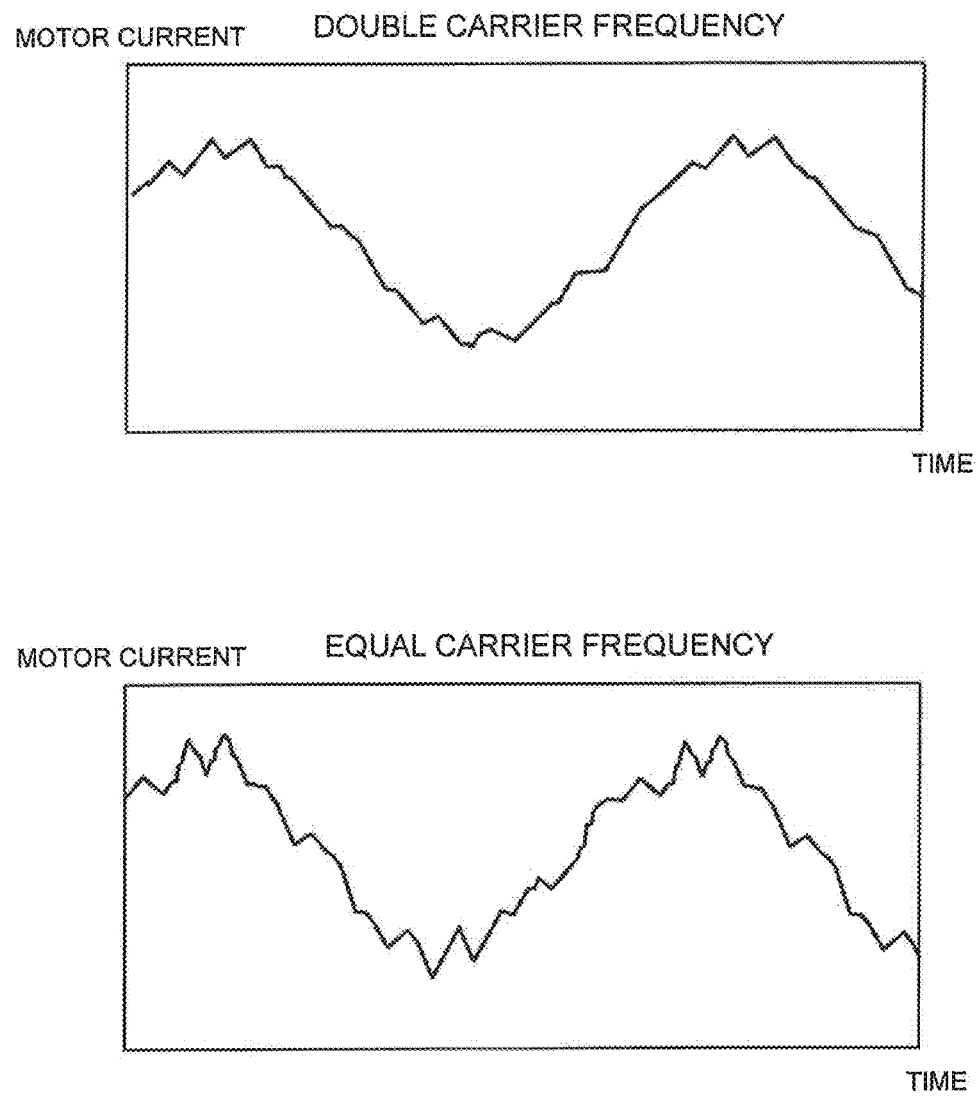
FIG. 13 is a diagram illustrating a current in one phase of the motor.

FIG. 12 is a diagram illustrating an applied voltage with respect to one phase of the motor 10. The upper row of the diagram illustrates an applied voltage in a case where the second carrier frequency is twice as large as the first carrier frequency, and the lower row of the diagram illustrates an applied voltage in a case where the first and the second carrier frequencies are equal. FIG. 13 is a diagram illustrating a current with respect to one phase of the motor 10. The upper row of the diagram illustrates a motor current in a case where the second carrier frequency is twice as large as the first carrier frequency, and the lower row of the diagram illustrates a motor current in a case where the first and the second carrier frequencies are equal.

As is clear from a comparison of the upper row (double frequency) with the lower row (equal frequency) in FIG. 12, when the first and the second carrier frequencies are made different from each other, the number of switching operations becomes larger and the applied voltage changes more finely than in the case where the first and the second carrier frequencies are equal. Accordingly, as is clear from a comparison of the upper row (double frequency) with the lower row (equal frequency) in FIG. 13, when the first and the second carrier frequencies are made different from each other, the motor current changes smoothly.

Figure 14:
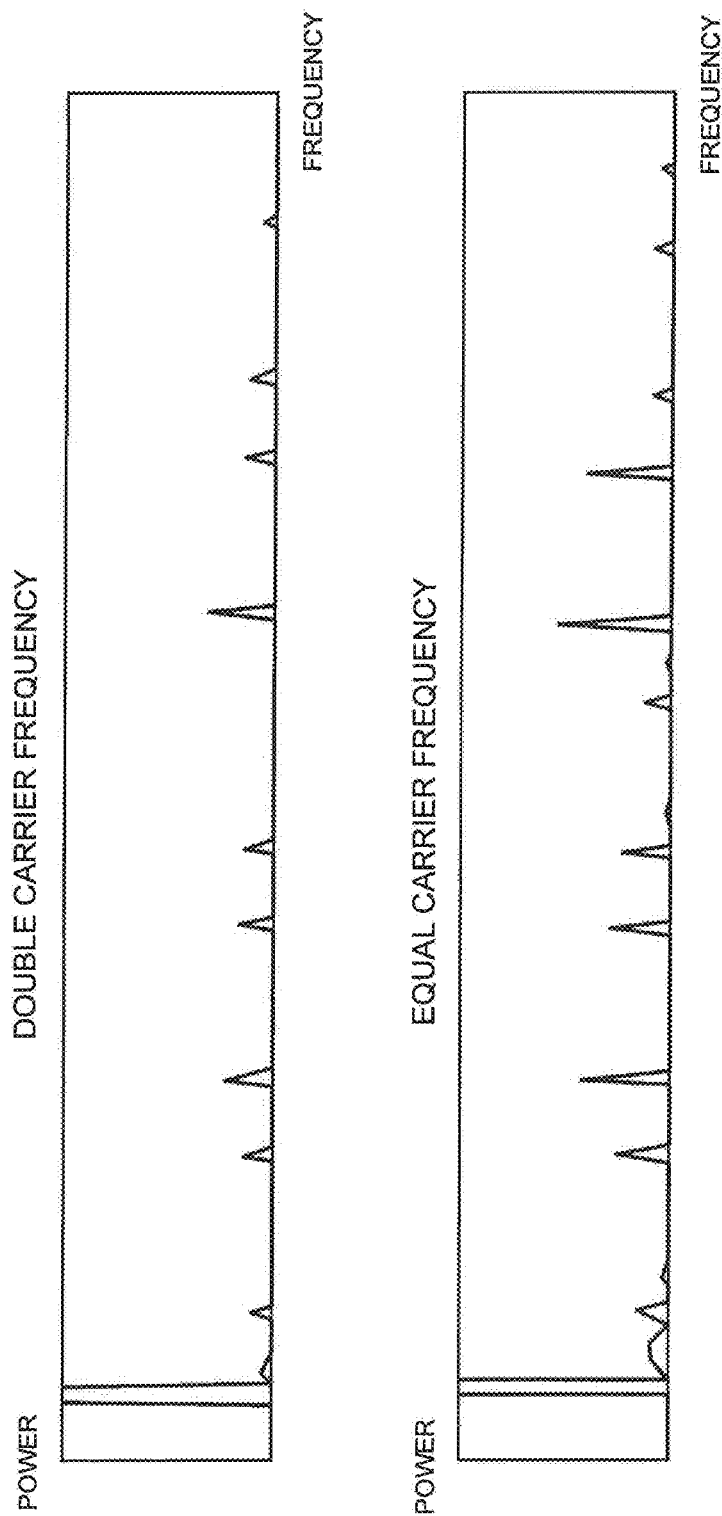
FIG. 14 is a diagram illustrating results of frequency analysis of a motor current.

FIG. 14 is a diagram illustrating results of frequency analysis (fast Fourier transform) of the motor current. The upper row of the diagram illustrates a result of frequency analysis in a case where the second carrier frequency is twice as large as the first carrier frequency, and the lower row of the diagram illustrates a result of frequency analysis in a case where the first and the second carrier frequencies are equal. As is clear from a comparison of the upper row (double frequency) with the lower row (equal frequency) in FIG. 14, when the first and the second carrier frequencies are made different, in the motor current, the number of frequencies with a peak decreases and the power of each peak also decreases as compared with the case where the first and the second carrier frequencies are equal. FIG. 14 shows that, current ripples are reduced in the case where the first and the second carrier frequencies are made different from each other (in the case of the upper row), as compared with the case where the first and the second carrier frequencies are equal (in the case of the lower row).

The current ripples are reduced not only in the case where the first and the second carrier frequencies are made different from each other but also in a case where the inverter voltage vectors V (INV1) and V (INV2) which are applied to the two inverters 12 and 14 are made different from each other in magnitude or in phase. However, in general, the magnitude and the phase of the two inverter voltage vectors V (INV1) and V (INV2) are determined by the SOCs and the temperatures of the two batteries 18 and 22, the temperatures of the two inverters 12 and 14, and the efficiency of the motor 10. Accordingly, it is not always possible to make the two inverter voltage vectors V (INV1) and V (INV2) different in magnitude or in phase. In particular, in a case where the two inverters 12 and 14 are similar in type and the two batteries 18 and 22 are similar in type, the SOCs and the temperatures hardly differ from each other, and it is expected that the two inverter voltage vectors V (INV1) and V (INV2) are often made equal in magnitude and in phase. Furthermore, when the two inverter voltage vectors V (INV1) and V (INV2) are made different in magnitude or in phase for the purpose of reducing ripples, such a case requires vector calculation and causes a complicated operation in the distribution unit 40.

On the other hand, the carrier frequency may be changed freely irrespective of the magnitude and the phases of the inverter voltage vectors V (INV1) and V (INV2). Accordingly, making the first and the second carrier frequencies different enables reduction of current ripples on a constant basis and reduction of complicated vector calculation in the distribution unit 40.

As is clear from the above description, in this example, the changing characteristic of the first carrier frequency (the frequency maps or the first changeover temperature Tc1) and the changing characteristic of the second carrier frequency (the frequency maps or the second changeover temperature Tc2) are different from each other. Therefore, it is possible to set a carrier frequency suitable for a condition of a corresponding inverter 12 or 14. Furthermore, in this example, the first carrier frequency and the second carrier frequency are different from each other at an identical motor operating point (torque and rotative speed). Such an arrangement makes it possible to reduce current ripples.

Note that the arrangement described here is an example, and as long as at least the changing characteristic of the first carrier frequency and the changing characteristic of the second carrier frequency are different from each other, other arrangements may be changed as appropriate. For example, in this example, the first inverter 12 and the second inverter 14 are similar in type, but these two inverters 12 and 14 may be different types of inverters. Furthermore, in the above description, the motor voltage vector V is distributed to the first inverter 12 and the second inverter 14 at any ratio, but the distribution ratio may be fixed. For example, the first inverter voltage vector V (INV1) and the second inverter voltage vector V (INV2) may be equal in magnitude and in phase on a constant basis.

The invention claimed is:

1. A motor system, comprising:
a first inverter which converts direct current power from a first power supply into alternating current power;
a second inverter which converts direct current power from a second power supply into alternating current power;
a motor which is driven by the alternating current power from the first inverter and the alternating current power from the second inverter);
a motor control unit which calculates a motor voltage vector (V) corresponding to an output request for the motor, distributes the motor voltage vector (V) obtained to the first inverter and the second inverter, and outputs a first voltage command and a second voltage command according to a result of the distribution;
a first inverter control unit which produces a switching signal for driving the first inverter based on a comparison of a first carrier wave with a modulated wave that represents the first voltage command from the motor control unit, the first inverter control unit being configured to change a first carrier frequency, or a frequency of the first carrier wave, according to at least an operating point of the motor; and
a second inverter control unit which produces a switching signal for driving the second inverter based on a comparison of a second carrier wave with a modulated wave that represents the second voltage command from the motor control unit, the second inverter control unit being configured to change a second carrier frequency, or a frequency of the second carrier wave, according to at least an operating point of the motor,
wherein the first carrier frequency has a changing characteristic depending on the first inverter control unit and the second carrier frequency has a changing characteristic depending on the second inverter control unit,
wherein the changing characteristics are different from each other to make the first carrier frequency and the second carrier frequency differ from each other at an identical operating point
wherein the first inverter control unit also changes the first carrier frequency depending on a temperature of the first inverter, wherein the second inverter control unit also changes the second carrier frequency depending on a temperature of the second inverter, wherein the first inverter control unit stores a high-temperature frequency map and a normal frequency map as frequency maps in which a correlation between the operating point and the first carrier frequency is recorded, where the high-temperature frequency map is referred to when the first inverter is at a temperature equal to or higher than a first temperature and the normal frequency map is referred to when the first inverter is at a temperature lower than the first temperature, wherein the second inverter control unit stores a high-temperature frequency map and a normal frequency map as frequency maps in which a correlation between the operating point and the second carrier frequency is recorded, where the high-temperature frequency map is referred to when the second inverter is at a temperature equal to or higher than a second temperature and the normal frequency map is referred to when the second inverter is at a temperature lower than the second temperature, and wherein the first temperature and the second temperature are different from each other.

2. The motor system according to claim 1, wherein the first inverter and the second inverter are similar in type.

* * * * *